United States Patent
Kumar et al.

(10) Patent No.: US 9,892,118 B2
(45) Date of Patent: Feb. 13, 2018

(54) DYNAMIC DISPLAY OF FILTER CRITERIA

(71) Applicant: Sonos, Inc., Santa Barbara, CA (US)

(72) Inventors: Abhishek Kumar, Santa Barbara, CA (US); Robert A. Lambourne, Santa Barbara, CA (US); Paul Bates, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 124 days.

(21) Appl. No.: 14/218,546

(22) Filed: Mar. 18, 2014

(65) Prior Publication Data
US 2014/0201197 A1    Jul. 17, 2014

(51) Int. Cl.
*G06F 17/30* (2006.01)

(52) U.S. Cl.
CPC .. *G06F 17/30029* (2013.01); *G06F 17/30761* (2013.01); *G06F 17/30769* (2013.01)

(58) Field of Classification Search
CPC ......... G06F 17/30749; G06F 17/30775; G06F 17/30053; G06F 17/30772; G06F 17/30017; G06F 17/30752; G06F 3/0482; G06F 17/30029; G06F 17/30058; G06F 17/3074; G06F 17/30769; G06F 3/048; G06F 3/0481; G06F 3/04817; G06F 3/04842; G06F 3/04847
See application file for complete search history.

(56) References Cited

U.S. PATENT DOCUMENTS

| | | |
|---|---|---|
| 5,440,644 A | 8/1995 | Farinelli et al. |
| 5,761,320 A | 6/1998 | Farinelli et al. |
| 5,923,902 A | 7/1999 | Inagaki |
| 6,025,838 A | 2/2000 | Bardon et al. |

(Continued)

FOREIGN PATENT DOCUMENTS

| | | |
|---|---|---|
| EP | 1389853 A1 | 2/2004 |
| JP | 2001337960 A | 12/2001 |

(Continued)

OTHER PUBLICATIONS

"AudioTron Quick Start Guide, Version 1.0", Voyetra Turtle Beach, Inc., Mar. 2001, 24 pages.

(Continued)

*Primary Examiner* — James Trujillo
*Assistant Examiner* — Cheryl M Shechtman
(74) *Attorney, Agent, or Firm* — McDonnell Boehnen Hulbert & Berghoff LLP

(57) ABSTRACT

Example techniques described herein may provide a dynamic display of filter criteria on a control device of a media playback system. In one aspect, an implementation is provided that involves (a) causing a graphical display of a computing device to display (i) a first set of filter criteria and (ii) search results that include at least a plurality of media-source identifiers that identify a plurality of respective media sources, (b) receiving by the computing device selection data that indicates a selection of one of the plurality of media-source identifiers, (c) determining by the computing device a second set of filter criteria based on the selected media-source identifier, where the second set of filter criteria is different from the first set of filter criteria, and (d) causing the graphical display to display the determined second set of filter criteria.

20 Claims, 7 Drawing Sheets

(56) References Cited

U.S. PATENT DOCUMENTS

| | | |
|---|---|---|
| 6,032,202 A | 2/2000 | Lea et al. |
| 6,256,554 B1 | 7/2001 | Dilorenzo |
| 6,404,811 B1 | 6/2002 | Cvetko et al. |
| 6,469,633 B1 | 10/2002 | Wachter |
| 6,522,886 B1 | 2/2003 | Youngs et al. |
| 6,611,537 B1 | 8/2003 | Edens et al. |
| 6,631,410 B1 | 10/2003 | Kowalski et al. |
| 6,757,517 B2 | 6/2004 | Chang |
| 6,778,869 B2 | 8/2004 | Champion |
| D523,869 S | 6/2006 | Hally et al. |
| D530,339 S | 10/2006 | Hernandez et al. |
| 7,130,608 B2 | 10/2006 | Hollstrom et al. |
| 7,130,616 B2 | 10/2006 | Janik |
| 7,143,939 B2 | 12/2006 | Henzerling |
| 7,236,773 B2 | 6/2007 | Thomas |
| D545,837 S | 7/2007 | Haldimann et al. |
| D550,242 S | 9/2007 | Niijima |
| D550,244 S | 9/2007 | Niijima |
| 7,295,548 B2 | 11/2007 | Blank et al. |
| D559,264 S | 1/2008 | Niijima |
| 7,398,479 B2 | 7/2008 | Hooper et al. |
| 7,483,538 B2 | 1/2009 | McCarty et al. |
| D592,223 S | 5/2009 | Neuhaus |
| D594,015 S | 6/2009 | Singh et al. |
| 7,545,440 B2 | 6/2009 | Kim et al. |
| 7,560,637 B1 | 7/2009 | Robbin et al. |
| 7,571,014 B1 | 8/2009 | Lambourne et al. |
| D601,166 S | 9/2009 | Chen et al. |
| 7,630,501 B2 | 12/2009 | Blank et al. |
| 7,643,894 B2 | 1/2010 | Braithwaite et al. |
| 7,657,910 B1 | 2/2010 | Mcaulay et al. |
| D615,989 S | 5/2010 | Chaudhri |
| D621,845 S | 8/2010 | Anzures et al. |
| 7,788,582 B2 | 8/2010 | Robbin et al. |
| D626,134 S | 10/2010 | Chaudhri |
| D628,206 S | 11/2010 | Lemay |
| 7,826,911 B1 | 11/2010 | Bennett |
| 7,853,341 B2 | 12/2010 | McCarty et al. |
| D631,060 S | 1/2011 | Flik et al. |
| D636,399 S | 4/2011 | Vance et al. |
| D639,818 S | 6/2011 | Woods et al. |
| 7,956,272 B2 | 6/2011 | Wysocki et al. |
| D642,194 S | 7/2011 | Kozlowski et al. |
| 7,987,294 B2 | 7/2011 | Bryce et al. |
| D643,436 S | 8/2011 | Lemay |
| D643,437 S | 8/2011 | Chaudhri |
| 8,014,423 B2 | 9/2011 | Thaler et al. |
| 8,017,852 B2 | 9/2011 | Yamashita et al. |
| 8,045,952 B2 | 10/2011 | Qureshey et al. |
| D652,050 S | 1/2012 | Chaudhri |
| 8,103,009 B2 | 1/2012 | McCarty et al. |
| D659,157 S | 5/2012 | Klein et al. |
| D660,311 S | 5/2012 | Klein et al. |
| D662,106 S | 6/2012 | Mori et al. |
| 8,234,395 B2 | 7/2012 | Millington |
| D665,409 S | 8/2012 | Gupta et al. |
| 8,243,961 B1 | 8/2012 | Morrill |
| 8,276,076 B2 | 9/2012 | Torrens et al. |
| D669,497 S | 10/2012 | Lee et al. |
| D671,552 S | 11/2012 | Mori et al. |
| D673,174 S | 12/2012 | Carpenter |
| D674,400 S | 1/2013 | Fong et al. |
| D676,866 S | 2/2013 | Chaudhri |
| D680,551 S | 4/2013 | Ishii et al. |
| D681,660 S | 5/2013 | Matas |
| D682,292 S | 5/2013 | Mori et al. |
| D682,877 S | 5/2013 | Hartley et al. |
| D683,360 S | 5/2013 | Phelan et al. |
| D683,361 S | 5/2013 | Kocmick et al. |
| D683,738 S | 6/2013 | Wujcik et al. |
| D686,246 S | 7/2013 | Gardner et al. |
| 8,483,853 B1 | 7/2013 | Lambourne |
| D687,842 S | 8/2013 | Matas et al. |
| D689,510 S | 9/2013 | Rodrigues et al. |
| D690,724 S | 10/2013 | Frijlink |
| D695,307 S | 12/2013 | Wu |
| D696,684 S | 12/2013 | Yuk et al. |
| D696,688 S | 12/2013 | Yuk et al. |
| D697,531 S | 1/2014 | Phelan |
| 8,634,944 B2 | 1/2014 | Bull et al. |
| D700,194 S | 2/2014 | Kim et al. |
| D700,195 S | 2/2014 | Kim et al. |
| D701,233 S | 3/2014 | Heong et al. |
| D701,526 S | 3/2014 | Poston et al. |
| 8,683,378 B2 | 3/2014 | Bull et al. |
| D701,882 S | 4/2014 | Soegiono et al. |
| D709,913 S | 7/2014 | Hurd |
| 8,766,079 B2 | 7/2014 | Utsuki et al. |
| D715,821 S | 10/2014 | Varon et al. |
| D715,835 S | 10/2014 | Montgomery et al. |
| D719,186 S | 12/2014 | Kim |
| D720,367 S | 12/2014 | Woo |
| D720,766 S | 1/2015 | Mandal et al. |
| 8,954,855 B2 | 2/2015 | Shirai et al. |
| D725,133 S | 3/2015 | Smirin et al. |
| D725,145 S | 3/2015 | Johnson |
| 8,977,963 B1 | 3/2015 | Joyce et al. |
| D726,205 S | 4/2015 | Angelides |
| D726,735 S | 4/2015 | Asai |
| 9,021,354 B2 | 4/2015 | Helms |
| D733,175 S | 6/2015 | Bae |
| D738,400 S | 9/2015 | Bang et al. |
| D739,434 S | 9/2015 | Kim et al. |
| D739,867 S | 9/2015 | Faria et al. |
| D742,909 S | 11/2015 | Lee et al. |
| D742,915 S | 11/2015 | MacLean |
| D743,435 S | 11/2015 | Herold et al. |
| D746,853 S | 1/2016 | Heeter et al. |
| D746,862 S | 1/2016 | Lee et al. |
| D748,666 S | 2/2016 | Heeter et al. |
| D752,604 S | 3/2016 | Zhang |
| D754,700 S | 4/2016 | Lee et al. |
| D754,705 S | 4/2016 | Angelides |
| D755,193 S | 5/2016 | Sun et al. |
| D760,781 S | 7/2016 | Nakamura |
| D765,118 S | 8/2016 | Bachman et al. |
| D765,120 S | 8/2016 | Kim et al. |
| D765,685 S | 9/2016 | Suki |
| D768,183 S | 10/2016 | Steplyk et al. |
| D768,687 S | 10/2016 | Bae et al. |
| D769,287 S | 10/2016 | Lirov et al. |
| D769,316 S | 10/2016 | Williamson et al. |
| D769,322 S | 10/2016 | Rajeswaran et al. |
| D770,519 S | 11/2016 | Kobetz et al. |
| D771,097 S | 11/2016 | Choi |
| D771,671 S | 11/2016 | Eder |
| D772,272 S | 11/2016 | Lee et al. |
| D772,918 S | 11/2016 | Van Den Berg et al. |
| 9,529,979 B2 | 12/2016 | Torgerson et al. |
| 9,547,647 B2 | 1/2017 | Badaskar et al. |
| 2001/0042107 A1 | 11/2001 | Palm |
| 2002/0022453 A1 | 2/2002 | Balog et al. |
| 2002/0026442 A1 | 2/2002 | Lipscomb et al. |
| 2002/0089529 A1 | 7/2002 | Robbin |
| 2002/0124097 A1 | 9/2002 | Isely et al. |
| 2003/0157951 A1 | 8/2003 | Hasty |
| 2004/0024478 A1 | 2/2004 | Hans et al. |
| 2005/0108748 A1* | 5/2005 | Nishikawa ............ H04N 7/163 725/38 |
| 2006/0135085 A1 | 6/2006 | Chen |
| 2006/0156239 A1 | 7/2006 | Jobs et al. |
| 2007/0142944 A1 | 6/2007 | Goldberg et al. |
| 2008/0250354 A1* | 10/2008 | Park ............ G06F 3/0482 715/845 |
| 2009/0255395 A1 | 10/2009 | Humphrey |
| 2009/0319947 A1 | 12/2009 | Wang et al. |
| 2010/0020983 A1 | 1/2010 | Waites |
| 2010/0306024 A1 | 12/2010 | Ryan |
| 2010/0318551 A1* | 12/2010 | Lai ............ G06F 17/30867 707/765 |
| 2011/0087964 A1 | 4/2011 | Patterson et al. |
| 2011/0143653 A1 | 6/2011 | Lane et al. |
| 2011/0153043 A1 | 6/2011 | Ojala |

(56) References Cited

U.S. PATENT DOCUMENTS

| | | | |
|---|---|---|---|
| 2011/0216640 A1* | 9/2011 | Curtis | G11B 7/00 369/100 |
| 2011/0225156 A1* | 9/2011 | Pavlik | G06F 17/30038 707/737 |
| 2011/0258547 A1 | 10/2011 | Symons et al. | |
| 2011/0276881 A1 | 11/2011 | Keng et al. | |
| 2012/0088477 A1 | 4/2012 | Cassidy | |
| 2012/0110452 A1 | 5/2012 | Hiipakka et al. | |
| 2012/0254755 A1 | 10/2012 | Wohlert | |
| 2013/0014015 A1 | 1/2013 | Lambourne et al. | |
| 2013/0047087 A1 | 2/2013 | Yamahara et al. | |
| 2013/0163783 A1 | 6/2013 | Burlingame | |
| 2013/0198268 A1 | 8/2013 | Hyman | |
| 2013/0198632 A1 | 8/2013 | Hyman | |
| 2013/0325840 A1* | 12/2013 | Kritt | G06F 17/30867 707/709 |
| 2013/0332831 A1* | 12/2013 | Birnkrant | H04N 21/4622 715/719 |
| 2014/0019596 A1 | 1/2014 | Sharkey | |
| 2014/0033039 A1 | 1/2014 | Kandekar et al. | |
| 2014/0052524 A1 | 2/2014 | Andersen | |
| 2014/0075308 A1 | 3/2014 | Sanders et al. | |
| 2014/0304117 A1* | 10/2014 | Nathan | G06F 17/30017 705/26.63 |
| 2015/0011290 A1 | 1/2015 | Galansky | |
| 2015/0095323 A1 | 4/2015 | Bates | |
| 2015/0134638 A1* | 5/2015 | Grosman | G06F 17/30041 707/722 |
| 2015/0149901 A1 | 5/2015 | Otto et al. | |
| 2015/0193196 A1 | 7/2015 | Lin et al. | |
| 2015/0310009 A1 | 10/2015 | Van Der Heide | |
| 2016/0216940 A1 | 7/2016 | Trammell | |

FOREIGN PATENT DOCUMENTS

| | | | |
|---|---|---|---|
| JP | 2009087065 A | 4/2009 | |
| JP | 2013254496 A | 12/2013 | |
| WO | 0153994 | 7/2001 | |
| WO | 2003093950 A2 | 11/2003 | |
| WO | 2009123694 A2 | 10/2009 | |

OTHER PUBLICATIONS

"AudioTron Reference Manual, Version 3.0", Voyetra Turtle Beach, Inc., May 2002, 70 pages.
"AudioTron Setup Guide, Version 3.0", Voyetra Turtle Beach, Inc., May 2002, 38 pages.
Jo J., et al., "Synchronized One-to-many Media Streaming with Adaptive Playout Control," Proceedings of SPIE, 2002, vol. 4861, pp. 71-82.
"UPnP; "Universal Plug and Play Device Architecture"; Jun. 8, 2000; version 1.0; Microsoft Corporation; pp. 1-54".
"U.S. Appl. No. 13/904,896, filed May 29, 2013, "Playback queue control via a playlist on a mobile device" Kumar et al."
"U.S. Appl. No. 13/904,909, filed May 29, 2013, "Playback Queue Control Transition" Kumar et al."
"U.S. Appl. No. 13/904,923, filed May 29, 2013, "Connected State Indicator" Kumar et al."
"U.S. Appl. No. 13/904,932, filed May 29, 2013, "Moving a Playback Queue to a New Zone" Kumar et al."
"U.S. Appl. No. 13/904,936, filed May 29, 2013, "Private Queue Indicator" Kumar et al."
"U.S. Appl. No. 13/904,944, filed May 29, 2013, "Playlist Modification" Kumar et al."
"U.S. Appl. No. 13/904,949, filed May 29, 2013, "Playback Zone Silent Connect" Kumar et al."
"U.S. Appl. No. 14/194,257, filed Feb. 28, 2014, "Playback Zone Representations" Kumar et al."
"Sonos Controller for Mac or PC Product Guide".
"Sonos Controleer for iPad Product Guide".
"Sonos Controller for iPhone Product Guide".
"Sonos Controller for Android Tablets Product Guide".
"Sonos Controller for Android Smartphones Product Guide".
International Searching Authority, International Search Report and Written Opinion dated May 29, 2015, issued in connection with International Application No. PCT/US2015/020989, filed on Mar. 17, 2015, 10 pages.
"Bluetooth. "Specification of the Bluetooth System: The ad hoc SCATTERNET for affordable and highly functional wireless connectivity" Core, Version 1.0 A, Jul. 26, 1999, 1068 pages".
"Bluetooth. "Specification of the Bluetooth System: Wireless connections made easy" Core, Version 1.0 B, Dec. 1, 1999, 1076 pages".
"Dell, Inc. "Dell Digital Audio Receiver: Reference Guide" Jun. 2000, 70 pages".
"Dell, Inc. "Start Here" Jun. 2000, 2 pages".
"Jones, Stephen. "Dell Digital Audio Receiver: Digital upgrade for your analog stereo" Analog Stereo. Jun. 24, 2000 <http://www.reviewsonline.com/articles/961906864.htm>retrieved Jun. 18, 2014, 2 pages".
"Louderback, Jim. "Affordable Audio Receiver Furnishes Homes With MP3" TechTV Vault. Jun. 28, 2000 <http://www.g4tv.com/articles/17923/affordable-audio-receiver-furnishes-homes-with-mp3/> retrieved Jul. 10, 2014, 2 pages".
"Palm, Inc. "Handbook for the Palm VII Handheld" May 2000, 311 pages".
"Presentations at WinHEC 2000" May 2000, 138 pages.
Non-Final Office Action dated Jan. 22, 2016, issued in connection with U.S. Appl. No. 29/484,346, filed Mar. 7, 2014, 5 pages.
Restriction Requirement dated Feb. 1, 2016, issued in connection with U.S. Appl. No. 29/484,244, filed Mar. 7, 2014, 5 pages.
Non-Final Office Action dated Feb. 12, 2016, issued in connection with Design U.S. Appl. No. 29/484,343, filed Mar. 7, 2014, 9 pages.
Non-Final Office Action dated Feb. 12, 2016, issued in connection with Design U.S. Appl. No. 29/484,339, filed Mar. 7, 2014, 9 pages.
Restriction Requirement dated Jan. 22, 2016, issued in connection with Design U.S. Appl. No. 29/484,345, filed Mar. 7, 2014, 6 pages.
Ex Parte Office Action dated Jul. 1, 2016, issued in connection with U.S. Appl. No. 29/484,344, filed Mar. 7, 2014, 16 pages.
Ex Parte Quayle Office Action dated Jul. 29, 2016 issued in connection with U.S. Appl. No. 29/484,347, filed Mar. 7, 2014, 6 pages.
"Denon 2003-2004 Product Catalog," Denon, 2003-2004, 44 pages.
Non-Final Office Action dated Jun. 10, 2016, issued in connection with U.S. Appl. No. 29/497,136, filed Jul. 21, 2014, 6 pages.
Notice of Allowability for a Design Application dated Jul. 6, 2016, issued in connection with U.S. Appl. No. 29/484,347, filed Mar. 7, 2014, 7 pages.
Notice of Allowance dated Sep. 14, 2016, issued in connection with U.S. Appl. No. 29/484,344, filed Mar. 7, 2014, 7 pages.
Notice of Allowance dated Dec. 15, 2016 issued in connection with U.S. Appl. No. 29/484,346, filed Mar. 7, 2014, 11 pages.
Notice of Allowance dated Dec. 20, 2016 issued in connection with U.S. Appl. No. 29/484,347, filed Mar. 7, 2014, 5 pages.
Notice of Allowance dated Dec. 30, 2016, issued in connection with U.S. Appl. No. 29/484,339, filed Mar. 7, 2014, 8 pages.
United States Patent and Trademark Office, U.S. Appl. No. 60/490,768, filed Jul. 28, 2003, entitled "Method for synchronizing audio playback between multiple networked devices," 13 pages.
United States Patent and Trademark Office, U.S. Appl. No. 60/825,407, filed Sep. 12, 2003, entitled "Controlling and manipulating groupings in a multi-zone music or media system," 82 pages.
Yamaha DME 64 Owner's Manual; copyright 2004, 80 pages.
Yamaha DME Designer 3.5 setup manual guide; copyright 2004, 128 pages.
International Bureau, International Preliminary Report on Patentability dated Sep. 29, 2016, issued in connnection with International Application No. PCT/US2015/020989, filed on Mar. 17, 2015, 7 pages.
Airplay icon, Quora.com, published online Feb. 5, 2013, retrieved online Mar. 21, 2016, retrieved from internet https :/ /www.quora.co m/Can-1-stream-m us ic-from-my-i Phone-and-my-Mac-to-my-home-stereo-using-Apple-TV.

(56) References Cited

OTHER PUBLICATIONS mVideoPlayer icon, by Daniel Nilsson, published Dec. 21, 2014, retrieved online Mar. 16, 2016, retrieved from internet https://apkdl.com/mvideoplayer.
Notice of Allowance dated Apr. 11, 2016, issued in connection with U.S. Appl. No. 29/484,347, filed Mar. 7, 2014, 12 pages.
Promote Icon, p. 218, "1 000 Icons, Symbols and Pictograms", © 2006 Rockport Publishers, available from Design Non-patent Literature Library.
Sound Loader for SoundCioud icon, by gruebeiTech, published Nov. 16, 2015, retrieved online Apr. 2, 2016, retrieved from Internet https://apk-dl.com/soundloader-for-soundcloud.
Trademark Registration No. 2854403, Jun. 15, 2004, Registrant—Usbnet, Inc., Trademark Electronic Search System (TESS).
Trademark Registration No. 2906182, Nov. 30, 2004, Registrant—Utescheny AG Corp., Trademark Electronic Search System (TESS).
Trademark Serial No. 76679508, Jul. 13, 2007, Applicant—Gabay, Gordon W., Trademark Electronic Search System (TESS).
Trademark Serial No. 85364721, Jul. 6, 2011, Applicant—Damian, Joel Estrada, Trademark Electronic Search System (TESS).
European Patent Office, Extended Search Report dated Feb. 1, 2017, issued in connection with European Application No. 15764415.4, 9 pages.
Japanese Patent Office, English Translation of Office Action dated Oct. 31, 2017, issued in connection with Japanese Patent Application No. 2017-501081, 1 page.
Japanese Patent Office, Office Action dated Oct. 31, 2017, issued in connection with Japanese Application No. 2017-50108, 5 pages.

\* cited by examiner

DYNAMIC DISPLAY OF FILTER CRITERIA

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

Figure 1:
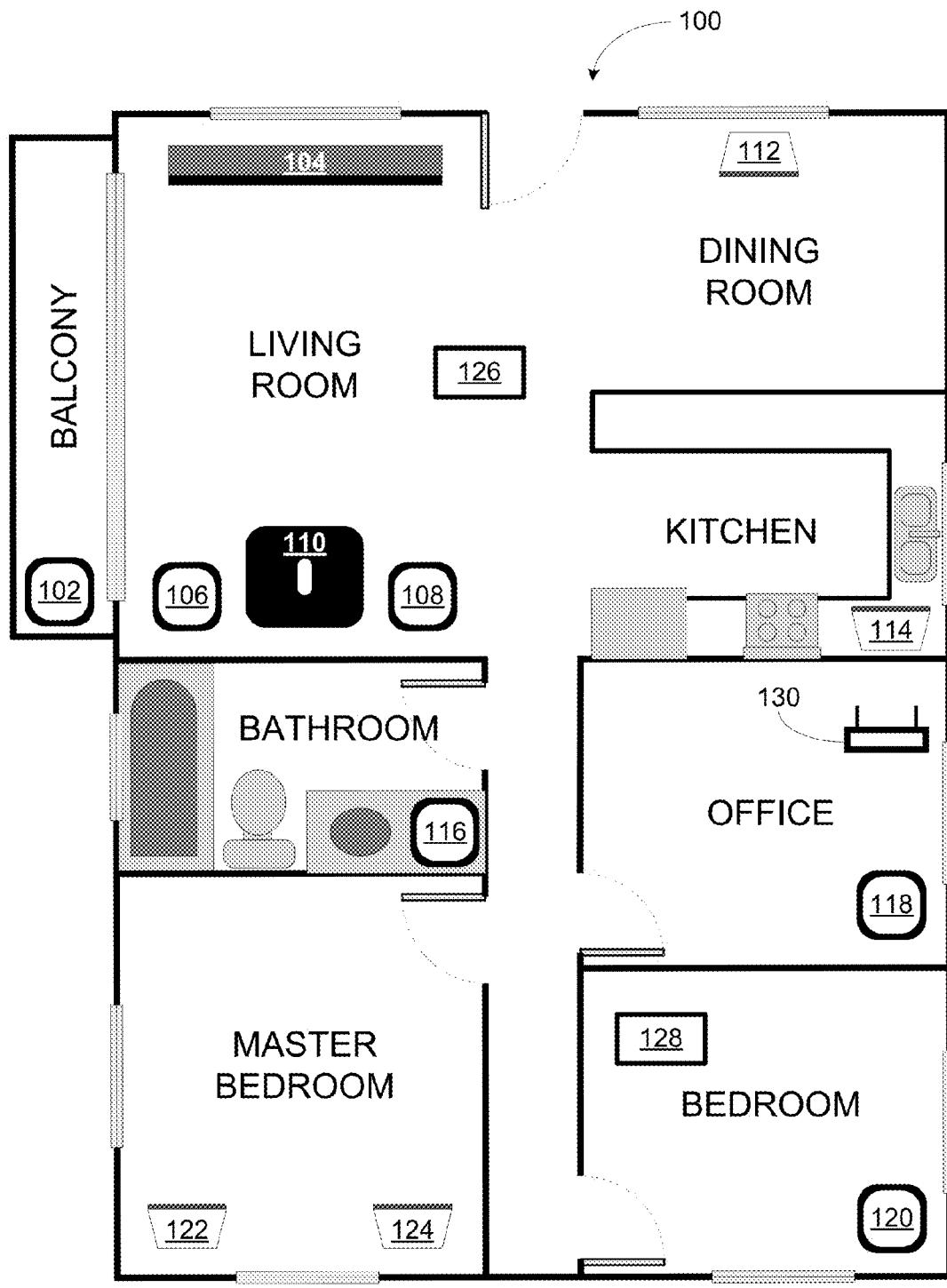
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

The playback of media items (e.g., songs, videos, etc.) has become an everyday activity for many people. Accordingly, there are now many media sources from which a user may search for or otherwise access media items. For example, there are various streaming media sources, such as Pandora® Radio, Spotify®, Songza®, Slacker® Radio, Google Play™, and iTunes Radio$^{SM}$, among others. As the number of media-source options has increased, the complexity of media-item search results has likewise increased. In order to improve user experience, it may be desirable to more conveniently view search results of media items provided by such media sources, and to filter such results to help find a particular media item. Embodiments described herein provide for a dynamic display of filter criteria on a control device of a media playback system to help provide such a convenient way to view search results.

For example, a control device of a media playback system may provide a user interface from which a user may control the media playback system. One operation that a user may perform with such a user interface may involve searching for a media item that may ultimately be played back by the media playback system. In such an operation, a user may search for the media item directly (e.g., by inputting the media item title or a portion thereof) or a user may search for the media item indirectly (e.g., by first searching for an artist name, album title, etc.).

In any event, after the control device receives a search input from the user, the control device may then return search results to the user. The search results may be displayed in a number of ways and may include a variety of information. In one example, the search results may identify one or more media sources that provide one or more media items that are relevant to the user's search, and the search results may also identify relevant media-item information (e.g., artist names, albums titles, track titles, etc.).

The search results may be displayed along with a first set of filter criteria that may be used by the user to focus and/or organize the user's search. For instance, the first set of filter criteria may allow the user to view a subset of the search results. Further, the first set of filter criteria may allow the user to sort the search results based on particular classifications. For example, the first set of filter criteria may include Artists, Tracks, Albums, Playlists, Stations, Shows, and Genres. As such, the first set of filter criteria may allow the user to sort the search results by, for example, artist name.

At some point, the user may select a particular media source from among which the search results were generated. Such a selection may indicate that the user is interested in viewing search results associated with the selected media source. Based on this selection, the control device may determine a second set of filter criteria and then return filter results along with the second set of filter criteria. The filter results may include information from the search results that is associated with the particular media source, and the second set of filter criteria may be used to further focus the filter results.

The second set of filter criteria may differ from the first set of filter criteria. For example, the second set of filter criteria may include: Artists, Genres, and Tracks. Furthermore, the second set of filter criteria may reflect filter criteria that are related to the selected media source. For example, the second set of filter criteria may only include criteria that are provided by the selected media source when a user searches the selected media source's media library. As such, the second set of filter criteria may allow the user to view aspects of and organize the filter results in manner tailored to the selected media source.

As indicated above, examples provided herein relate to a dynamic display of filter criteria on a control device of a media playback system. In one aspect, a method is provided. The method involves: (a) causing a graphical display of a computing device to display (i) a first set of filter criteria and (ii) search results that comprise a plurality of media-source identifiers that identify a plurality of respective media sources, (b) receiving by the computing device selection data that indicates a selection of one of the plurality of media-source identifiers, (c) determining by the computing device a second set of filter criteria based on the selected media-source identifier, where the second set of filter criteria is different from the first set of filter criteria, and (d) causing the graphical display to display the determined second set of filter criteria.

In another aspect, a device is provided. The device includes a graphical display, an input interface, a non-transitory computer-readable medium, and program instructions stored on the non-transitory computer-readable medium and executable by at least one processor to cause the computing device to: (a) cause the graphical display to display (i) a first set of filter criteria and (ii) search results that comprise a plurality of media-source identifiers that identify a plurality of respective media sources, (b) receive by the input interface selection data that indicates a selection of one of the plurality of media-source identifiers, (c) determine a second set of filter criteria based on the selected media-source identifier, where the second set of filter criteria is different from the first set of filter criteria, and (d) cause the graphical display to display the determined second set of filter criteria.

In yet another aspect, a non-transitory computer-readable memory is provided. The non-transitory computer-readable medium having instructions stored thereon that are executable by at least one processor. The instructions include instructions for (a) causing a graphical display of a computing device to display (i) a first set of filter criteria and (ii) search results that comprise a plurality of media-source identifiers that identify a plurality of respective media sources, (b) receiving by the computing device selection data that indicates a selection of one of the plurality of media-source identifiers, (c) determining by the computing device a second set of filter criteria based on the selected media-source identifier, where the second set of filter criteria is different from the first set of filter criteria, and (d) causing the graphical display to display the determined second set of filter criteria.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
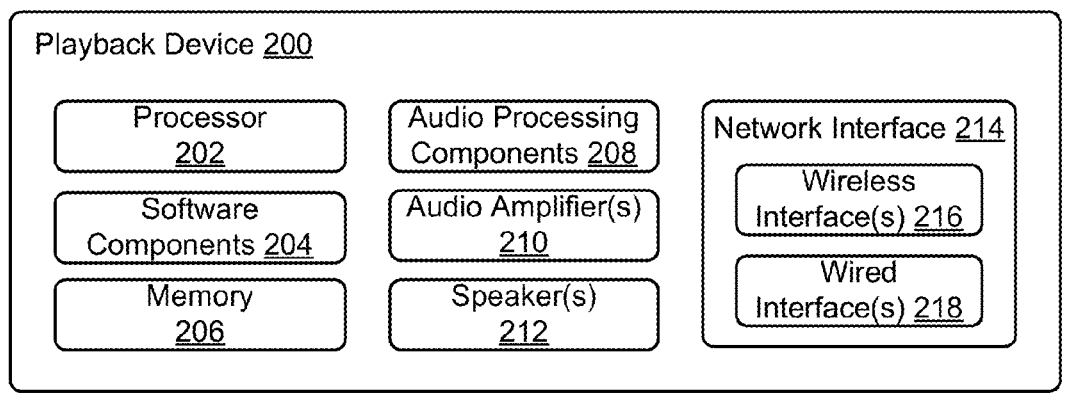
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process selection data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11 ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3 ," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
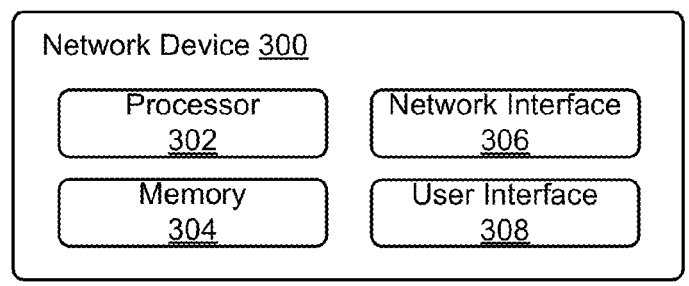
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™ iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
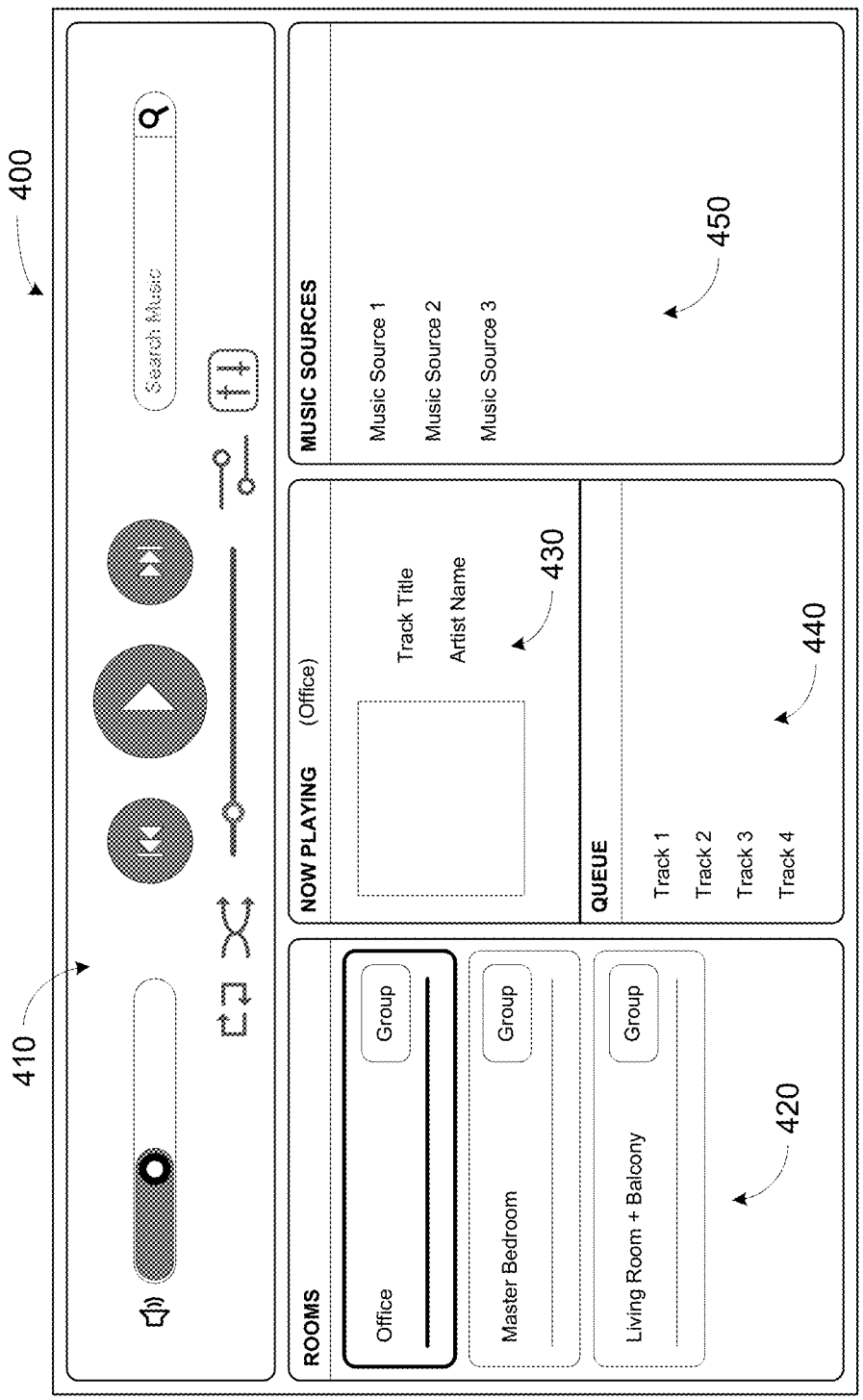
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Methods for Dynamic Display of Filter Criteria

As discussed above, embodiments described herein may provide a dynamic display of filter criteria on a control device of a media playback system.

Figure 5:
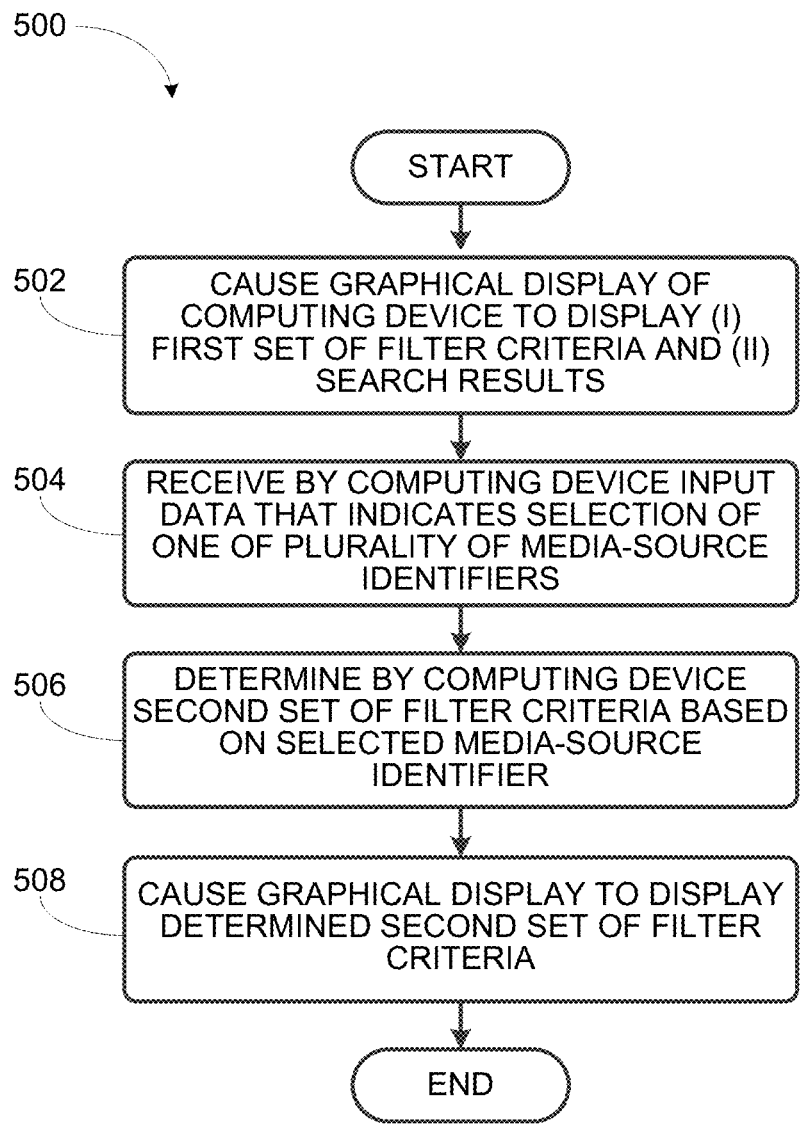
FIG. 5 shows an example flow diagram of an example method.

Method 500 shown in FIG. 5 presents an embodiment of a method that can be implemented within an operating environment involving, for example, the media playback system 100 of FIG. 1. In particular, the method 500 may be performed on a control device of the media playback system 100, such as the control device 300 of FIG. 3. In some implementations, a computing system (e.g., a cloud server) in communication with the control device may perform aspects of the method 500. The method 500 may include one or more operations, functions, or actions as illustrated by one or more of blocks 502-508. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer-readable medium, for example, such as a storage device including a disk or hard drive. The computer-readable medium may include non-transitory computer-readable medium, for example, such as computer-readable media that stores data for short periods of time like register memory, processor cache and Random Access Memory (RAM). The computer-readable medium may also include non-transitory media, such as secondary or persistent long term storage, like read only memory (ROM), optical or magnetic disks, compact-disc read only memory (CD-ROM), for example. The computer-readable media may also be any other volatile or non-volatile storage systems. The computer-readable medium may be considered a computer-readable storage medium, for example, or a tangible storage device. In addition, for the method 500 and other processes and methods disclosed herein, each block in FIG. 5 may represent circuitry that is wired to perform the specific logical functions in the process.

For clarity, the method 500 is described herein with reference to FIGS. 6A-6B and FIGS. 7A-7C. It should be understood, however, that this is for purposes of example and explanation only and that the operations of the method 500 are not limited to these figures.

The method 500 begins at block 502 with causing a graphical display of a computing device to display (i) a first set of filter criteria and (ii) search results that include at least a plurality of media-source identifiers that identify a plurality of respective media sources. At block 504, the method 500 involves receiving by the computing device selection data that indicates a selection of one of the plurality of media-source identifiers. At block 506, the method involves determining, by the computing device, a second set of filter criteria based on the selected media-source identifier, where the second set of filter criteria is different from the first set of filter criteria. At block 508, the method involves causing the graphical display to display the determined second set of filter criteria. Each of the blocks shown with respect to FIG. 5 is discussed in further detail below.

a. Causing Graphical Display to Display First Set of Filter Criteria & Search Results The method 500 begins at block 502 with causing a graphical display of a computing device to display (i) a first set of filter criteria and (ii) search results that include at least a plurality of media-source identifiers that identify a plurality of respective media sources. For example, the control device 300 may cause a graphical display of the control device 300 (e.g., the user interface 308) to display the first set of filter criteria and the search results.

In practice, before this function occurs, one or more functions may be performed at the control device 300. In particular, the control device 300 may first receive search data that indicates a search related to a media item. The control device 300 receiving the search data may be the result of the control device 300 receiving one or more user inputs that indicate a search string (e.g., a term or phrase) that reflects a media item that the user is attempting to locate. The search string may indicate, for example, a complete or partial artist name (or band name), media-item title (e.g., track title), album title, genre, station name, playlist name, or the like.

In response to the search data, the control device 300 may perform a search for media items and/or media-item information related to the search string. In one example, the control device 300 may perform such a search by searching media libraries of one or more media sources. The control device 300 may then generate search result data based on the search. The search result data may identify one or more media sources whose media libraries include media-item information relevant to the search string, and the search result data may also identify media-item information itself, such as one or more artist names, media-item titles, album titles, genres, station names, playlist names, show names, composer names, curator names (e.g., the name of a person, such as a celebrity, who creates playlists), or the like.

Furthermore, after the search, the control device 300 may determine a first set of filter criteria that, when displayed to the user, may provide a mechanism by which the user may input a command to the control device 300 to filter the search result data. In particular, the first set of filter criteria may be configured to allow the user to focus and/or organize the search result data. That is, the first set of filter criteria may allow the user to view subset of the search result data and/or organize the search result data based on certain classifications. For example, the first set of filter criteria may be configured to allow a user to filter the search result data by artist name, media-item title, album title, genre, station name, playlist name, show name, composer name, people, and the like. Those of ordinary skill in the art will appreciate that these are but a few examples of possible filter criteria.

Other examples are possible as well, and the specific filter criteria are not critical to the embodiments described herein.

The control device 300 may determine the first set of filter criteria in a number of ways. In one example, the control device 300 may determine the first set of filter criteria by obtaining information previously stored in the control device 300, a playback device, or elsewhere. In other examples, the control device 300 may determine the first set of filter criteria based on the media sources identified by the search result data. For instance, the control device 300 may store in the memory 304 filter criteria that the control device 300 has previously used in connection with a particular media source. The control device 300 may then determine the first set of filter criteria by compiling the stored filter criteria data of each respective media source identified by the search result data.

Additionally or alternatively, this function may involve the control device 300 receiving filter-criteria information from one or more media sources and then determining the first set of filter criteria based on the received filter-criteria information. For instance, a given media source may provide a mechanism by which a user may search within a media library of the given media source, and the given media source may also allow the user to filter search results using filter criteria unique to the given media source. At some point in time, the control device 300 may receive filter-criteria information from the given media source that indicates filter criteria unique to the given media source. For example, the control device 300 may receive such information from the given media source the first time the control device 300 accesses the given media service, such as when a user first registers the control device 300 with an account on the given media source. In other examples, the control device 300 may periodically receive filter-criteria information from a media source, such as whenever the media source updates such information. The control device 300 may receive such information from multiple media sources and then determine the first set of filter criteria based on the received information in a number of ways.

In one instance, determining the first set of filter criteria based on the received filter-criteria information may involve the control device 300 using the received filter-criteria information as the first set of filter criteria. That is, the first set of filter criteria may be the same as the filter criteria unique to the media sources. In another instance, this function may involve the control device 300 generating one or more generic filter criteria based on the received filter-criteria information. For example, filter-criteria information from a first media source may indicate that the first media source uses a filter criteria of Song Name, while filter-criteria information from a second media source may indicate that the second media source uses a filter criteria of Track Title. The control device 300 may be configured to determine that Song Name and Track Title are similar in meaning, and from such determination, the control device 300 may generate a generic filter criteria, such as Tracks that encompasses both Song Name and Track Title. Other examples are also possible. The control device 300 may perform such operations for each received filter-criteria information.

Additionally or alternatively, the control device 300 may determine the first set of filter criteria by obtaining user preference inputs that indicate the user's preferences with respect to the first set of filter criteria. For example, a user may select which of the first set of filter criteria are displayed. In such an example, the control device 300 may store in the memory 304 any user preference data and obtain such data when the user performs a future search.

Alternatively, the first set of filter criteria may include the same filter criteria regardless of the search string and resulting search result data. That is, in some examples, the first set of filter criteria may be determined to be a predetermined set of default filter criteria.

In any event, after the control device 300 generates the search result data and determines the first set of filter criteria, the control device 300 may cause a graphical display of the control device 300 to display a first set of filter criteria and search results (e.g., displayed search result data). The first set of filter criteria and the search results may be displayed in a variety of arrangements and may be displayed in such a manner that a user may navigate to and otherwise interact with the first set of filter criteria and/or aspects of the search results.

Figures 6A, 6B:
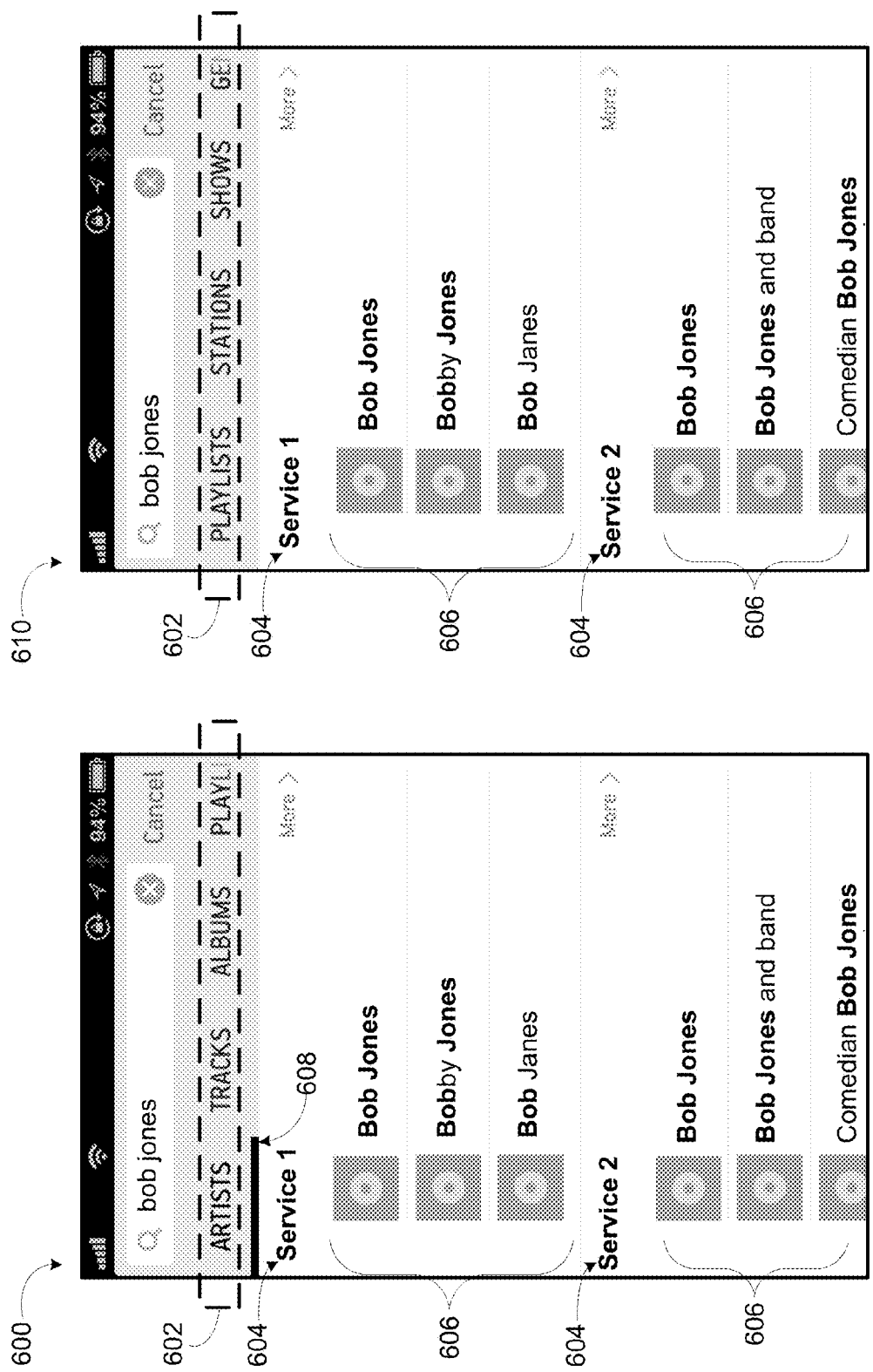
FIGS. 6A and 6B each show examples of graphical displays according to the example method shown in FIGS. 5.

To illustrate, FIGS. 6A and 6B each show examples of graphical displays according to the method 500. The control device 300 may cause graphical displays 600 and 610 to display search results after receiving a user input that indicated a search string of "bob jones" at the user interface 308. As shown, the graphical displays 600 and 610 each show a first set of filter criteria 602, and search results that include media-source identifiers 604 and media-item information (e.g., artist names) 606 that are organized by media source. In the present example, the search results are organized by artist name, as indicated by filter indicator 608 below the "Artists" criteria, but it should be understood that the search results may be organized according to any of the other criteria of the first set of filter criteria 602. For example, selecting the "Tracks" criteria may cause the search results to be organized and displayed by track title, and cause the filter indicator 608 to appear below the "Tracks" criteria. In particular, the search results may include media-source identifiers of media sources that have media-items whose titles are relevant to "bob jones" and the corresponding media-item identifiers that identify such media items. Other examples are possible as well.

As discussed above, the first set of filter criteria may allow the user to focus and/or organize the search result data. Accordingly, the first set of filter criteria may be displayed in any manner that allows a user to filter the displayed search results. For example, the first set of filter criteria may take the form of a graphic and/or text and may be configured such that user may select one or more criteria from the first set of filter criteria. Further, the first set of filter criteria may be displayed in such a manner that a user may navigate through or otherwise interact with the filter criteria. For example, the first set of filter criteria may be displayed with a scroll bar or a drop-down list that allows the user to navigate through the filter criteria. Other examples are possible as well.

As shown in FIGS. 6A and 6B, the first set of filter criteria 602 is displayed such that only a portion of the filter criteria is visible. To that end, the displayed first set of filter criteria 602 may be configured such that a user may navigate to portions of the filter criteria that are not presently visible to the user. Such functionality is depicted by comparing the first set of filter criteria 602 in FIGS. 6A and 6B. For example, the first set of filter criteria may include "Artists", "Tracks", "Albums", "Playlists", "Stations", "Shows", "Genres", "Composers", and "People" (e.g., curator names). As shown in FIG. 6A, the first set of filter criteria 602 is displayed as including "Artists", "Tracks", and "Albums", and a portion of "Playlists" is also displayed. FIG. 6B shows the first set of filter criteria 602 showing "Playlists", "Stations", and "Shows", and also a portion of "Genres" is showing. The first set of filter criteria 602 shown in FIG. 6B may be the result of a user scrolling the first set of filter criteria 602 from FIG. 6A to the left. The first set of filter criteria 602 may be displayed in other ways as well.

As also discussed above, the search results include at least multiple media-source identifiers. A media-source identifier may be any mechanism that identifies a given media source. As discussed above, there are many media sources, such as Pandora® Radio, Spotify®, Songza®, Slacker® Radio, Google Play™, and iTunes Radio$^{SM}$, among others. A media-source identifier operates to distinguish one media source from the others. For example, a media-source identifier may take the form of a graphic (e.g., a logo associated with the media source) and/or text that distinguishes a given media source from other media sources. Further, a media-source identifier may be configured such that a user may select the media-source identifier and cause the graphical display to output a new display. For example, a media-source identifier may include hyperlink functionality such that, when selected, causes the control device 300 to automatically output a different display.

Returning again to FIGS. 6A and 6B, the media-source identifiers 604 identify streaming media sources, Service 1 and Service 2. Although only two media-source identifiers are shown, the search results may include additional media-source identifiers and/or media-item information that are not visible. Accordingly, the user may be able to navigate to portions of the search results that are not presently visible to the user.

In addition to the aspects of the search results just discussed, the search results may include additional aspects as well. For example, the search results may include media-item information from the search result data, such as one or more artist names, album titles, genres, station names, playlist names, show names, composer names, and/or people, among other examples. Such information may be displayed in a number of manners, such as by text and/or graphics.

As shown in FIGS. 6A and 6B, the media-item information 606 may include information relevant to the search string that caused the search results to be generated. In this example, the media-item information 606 includes artist names relevant to the search string "bob jones". For instance, the media-item information 606 includes artist names that contain either term from the search string, and the media-item information 606 also includes artist names from other disciplines other than music, such as comedy. Furthermore, the media-item information 606 may be displayed in a manner that emphasizes the search terms from the search string (e.g., by bolding such search terms). As also shown, the media-item information 606 is displayed with both text and a graphic associated with a given artist name. The media-item information 606 may be displayed in other manners as well.

Additionally, the search results may include one or more media-item identifiers that identify one or more respective media items. A media-item identifier may be any mechanism that distinguishes a given media item from other media items. For example, a media-item identifier may take the form of text (e.g., the title of the media item) and/or a graphic (e.g., album art associated with the media item). Further, a media-item identifier may be configured such that, when selected, the control device 300 transmits a request to the corresponding media source to retrieve the media item. What is more, when a media-item identifier is selected, the control device 300 may display additional media-item information related to the corresponding media item.

b. Receiving Selection Data

Returning back to FIG. 5, at block 504, the method 500 involves receiving by the computing device selection data that indicates a selection of one of the plurality of media-source identifiers. For example, the control device 300 may receive a user input at the user interface 308 that indicates a selection of one of the media-source identifiers 602. The user input may take the form of a touch input or a voice command, among other user input types. In this way, the user may select a media-source identifier to narrow the search results by a given media source.

Accordingly, the control device 300 may then perform a filter operation with the search result data. In particular, the control device 300 may generate filter result data that includes data from the search result data that is related to the media source identified by the selected media-source identifier. The control device 300 may perform other operations as well.

c. Determining Second Set of Filter Criteria

After receiving the selection data, at block 506, the method involves determining by the computing device a second set of filter criteria based on the selected media-source identifier, where the second set of filter criteria is different from the first set of filter criteria. This function may be performed in a number of ways.

In one example, this function may involve the control device 300 retrieving from the memory 304 filter criteria that the control device 300 has previously associated as the second set of filter criteria in connection with the media source identified by the selected media-source identifier. In another example, this function may involve the control device 300 using filter-criteria information that the control device 300 received from the media source identified by the selected media-source identifier. In another example, this function may involve the control device 300 using filter-criteria information that the control device 300 received from a playback device 200. Other examples are possible as well.

In other examples, this function may involve the control device 300 accessing received filter-criteria information and then mapping such received information to control-device specific criteria. For instance, the control device 300 may have received from a media source and stored in the memory 304 filter-criteria information indicating that the media source uses a filter criteria of "Band Name". The control device 300 may determine that that filter criteria maps to a control-device specific criteria of "Artists" and may then use "Artists" as a criteria of the second set of filter criteria. The control device 300 may do the same for any other filter-criteria information the control device 300 has received from the media source identified by the selected media-source identifier. In example implementations, a computing system (such as a cloud server) or a different computing device (such as a playback device) may perform the mapping functions and then transmit, perhaps periodically, to the control device 300 the second set of filter criteria.

Additionally or alternatively, the second set of filter criteria may be determined without regard to the first set of filter criteria. For example, the control device 300 may have determined a criteria of the first set of criteria to be "Tracks". For instance, the control device 300 may have generated a generic filter criteria of "Tracks" after receiving filter-criteria information from a first media source indicating that the first media source uses a filter criteria of "Song Name" and filter-criteria information from a second media source indicating that the second media source uses a filter criteria of "Track Title". In such an example, if the selected media-source identifier corresponds to the first media source, the control device 300 may use "Song Name" in the second set of filter criteria even though the control device 300 used the generic search criteria "Tracks" in the first set of filter criteria. Other examples are also possible.

These are but a few examples of ways in which the second set of filter criteria may be determined. Other examples are also possible. In any event, the second set of filter criteria is determined such that the second set of filter criteria is different from the first set of filter criteria. For example, the second set of filter criteria may have more or less criteria than the first set of filter criteria. Further, the second set of filter criteria may include different criteria terminology than the first set of filter criteria. What is more, the second set of filter criteria may be ordered differently than the first set of filter criteria (e.g., the second set of filter criteria may be "ranked" based on the media source identified by the selected media-item identifier). Other example differences are also possible.

d. Causing Graphical Display to Display Second Set of Filter Criteria

Returning again to FIG. 5, at block 508, the method involves causing the graphical display to display the determined second set of filter criteria. For example, the control device 300 may cause the graphical display of the control device 300 (e.g., the user interface 308) to display the second set of filter criteria. The control device 300 may display the second set of filter criteria in a number of ways and along with media-item information as well.

In one example, the control device 300 may display the second set of filter criteria in the same or a similar manner as the control device 300 displayed the first set of filter criteria (e.g., both displayed via a scroll bar). In other examples, the control device 300 may display the second set of filter criteria in a different manner than the first set of filter criteria (e.g., one displayed via a horizontal scroll bar and the other displayed with a vertical scroll wheel). In this respect, because the second set of filter criteria is different than the first set of filter criteria, the control device 300 will display to the user a different presentation with respect to the filter criteria. In any event, the second set of filter criteria may be configured with functionality similar to that of the first set of filter criteria as discussed above.

Furthermore, the control device 300 may cause the graphical display to display any of the media-item information discussed above along with the second set of filter criteria. In particular, the control device 300 may display one or more media-item identifiers based on the selected media-source identifier from block 504. For example, the control device 300 may display media-item identifiers that identify media items that may be provided by the media source identified by the selected media-source identifier. Other media-item information may be displayed as well.

Figures 7A, 7B:
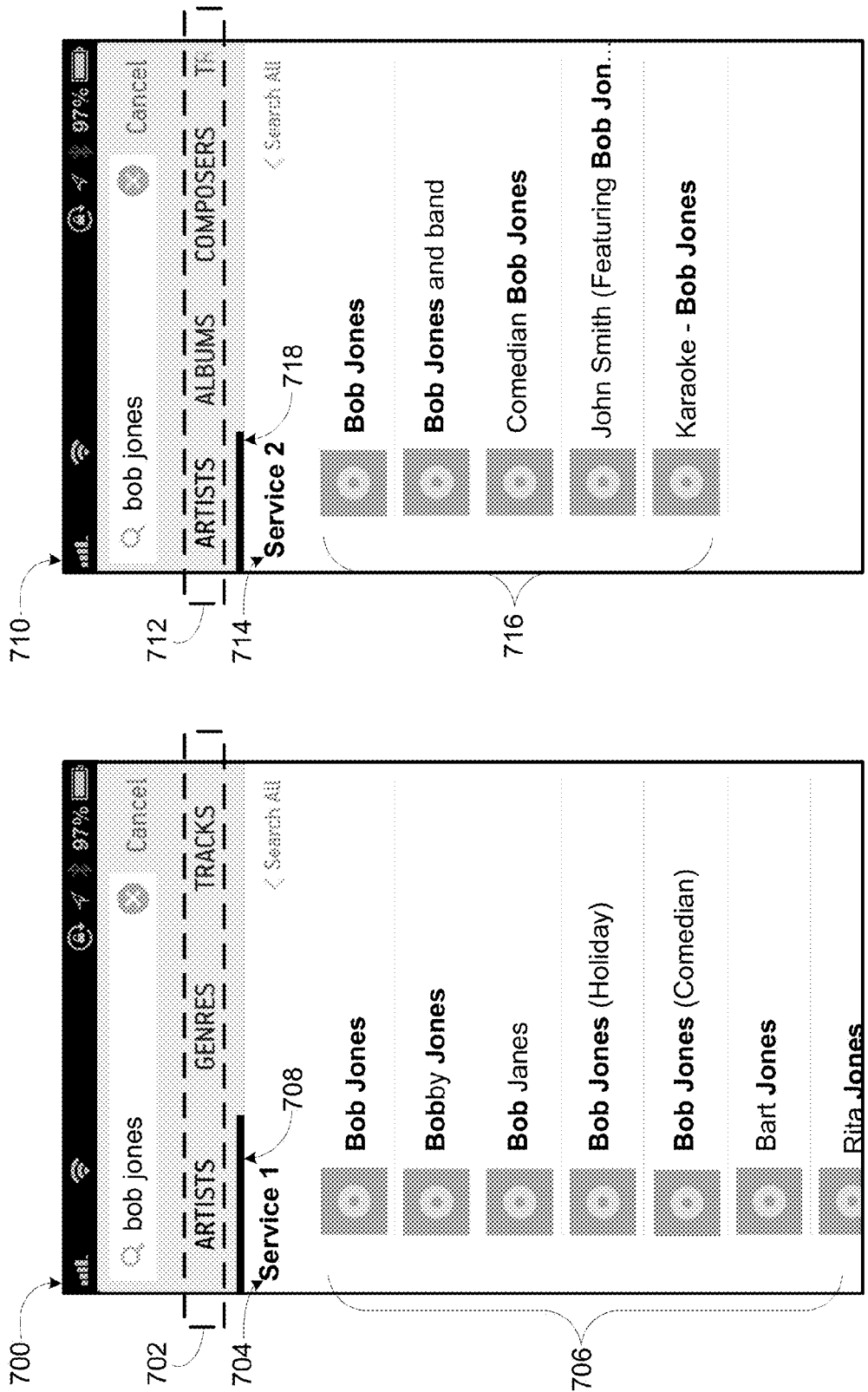
FIGS. 7A-7C each show examples of graphical displays according to the example method shown in FIG. 5.
Figure 7C:
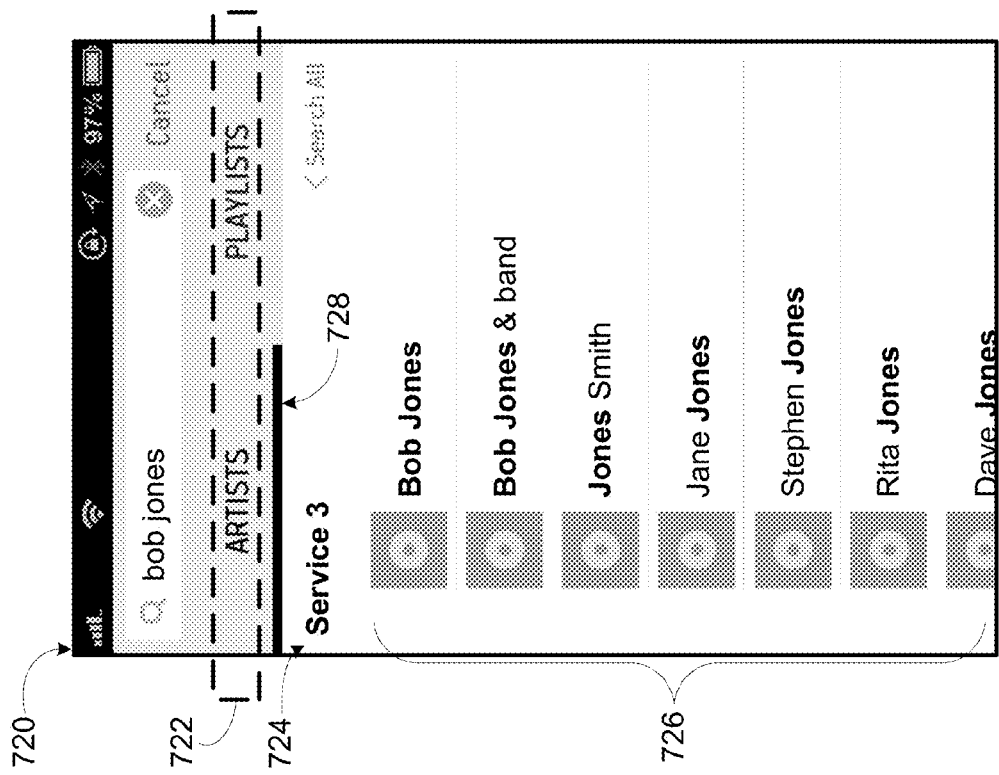

To illustrate, FIGS. 7A, 7B, and 7C each show examples of graphical displays according to the method 500. As shown, each graphical display 700, 710, and 720 shows a second set of filter criteria 702, 712, and 722 and filter results. Each filter result includes a media-source identifier 704, 714, and 724 that corresponds to the selected media-item identifier from block 504 and media-item information (e.g., artist names) 706, 716, and 726. The filter results are organized by artist name, as indicated by the filter indicators 708, 718, and 728 below the "Artists" criteria, but it should be understood that the filter results may be organized according to any of the other criteria of the respective second set of filter criteria.

The graphical displays 700, 710, and 720 may be a result of a selection of a media-source identifier from either of the graphical displays 600 or 610 of FIGS. 6A and 6B, respectively. For example, the graphical display 700 of FIG. 7A may be a result of a user selecting the media-source identifier 604 corresponding to Service 1. As shown, the second set of filter criteria 702 includes "Artists", "Genres", and "Tracks", which are different criteria than those of the first set of filter criteria 602.

Similarly, the graphical display 710 of FIG. 7B may be a result of a user selecting the media-identifier 604 corresponding to Service 2. As shown, the second set of filter criteria 712 is displayed including "Artists", "Albums", and "Composers", and also a portion of "Tracks" is displayed. In line with the above discussion, the second set of filter criteria 712 may be configured to be navigable such that the user may view portions of the second set of filter criteria 712 that are presently not visible. In any event, the second set of filter criteria 712 is different than the first set of filter criteria 602.

Likewise, the graphical display 720 of FIG. 7C may be a result of a user selecting a media-identifier corresponding to Service 3 (not shown in FIGS. 6A and 6B). As depicted, the second set of filter criteria 722 includes "Artists" and "Playlists", which is a different set of criteria than the first set of filter criteria 602.

After the control device 300 causes the graphical display to display the determined second set of filter criteria, various operations may occur at the control device 300. For example, the control device 300 may receive a user input indicating a selection of one of the criteria from the second set of filter criteria or a selection of one of the media-item information. In response to such an input, the control device 300 may cause the graphical display to output a new display and/or may contact a media source to obtain a media-item. The control device 300 may perform other operations as well.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

As indicated above, examples provided herein relate to providing a dynamic display of filter criteria on a control device of a media playback system. In one aspect, a method is provided. The method involves: (a) causing a graphical display of a computing device to display (i) a first set of filter criteria and (ii) search results that comprise a plurality of media-source identifiers that identify a plurality of respective media sources, (b) receiving by the computing device selection data that indicates a selection of one of the plurality of media-source identifiers, (c) determining by the computing device a second set of filter criteria based on the selected media-source identifier, where the second set of filter criteria is different from the first set of filter criteria, and (d) causing the graphical display to display the determined second set of filter criteria.

In another aspect, a device is provided. The device includes a graphical display, an input interface, a non-transitory computer-readable medium, and program instructions stored on the non-transitory computer-readable medium and executable by at least one processor to cause the computing device to: (a) cause the graphical display to display (i) a first set of filter criteria and (ii) search results that comprise a plurality of media-source identifiers that identify a plurality of respective media sources, (b) receive by the input interface selection data that indicates a selection of one of the plurality of media-source identifiers, (c) determine a second set of filter criteria based on the selected media-source identifier, where the second set of filter criteria is different from the first set of filter criteria, and (d) cause the graphical display to display the determined second set of filter criteria.

In yet another aspect, a non-transitory computer-readable memory is provided. The non-transitory computer-readable medium having instructions stored thereon that are executable by at least one processor. The instructions include instructions for (a) causing a graphical display of a computing device to display (i) a first set of filter criteria and (ii) search results that comprise a plurality of media-source identifiers that identify a plurality of respective media sources, (b) receiving by the computing device selection data that indicates a selection of one of the plurality of media-source identifiers, (c) determining by the computing device a second set of filter criteria based on the selected media-source identifier, where the second set of filter criteria is different from the first set of filter criteria, and (d) causing the graphical display to display the determined second set of filter criteria.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

We claim:

1. A method comprising:
receiving, via a computing device, input data indicating a search string;
retrieving, via a network interface of the computing device, respective search results from a plurality of streaming media services, wherein the respective search results indicate audio tracks corresponding to the search string;
causing, via the computing device, a graphical display to display a graphical interface comprising:
a first region that includes a graphical representation of a first set of filter criteria for filtering the retrieved search results according to respective metadata associated with the audio tracks indicated within the search results, wherein the first set of filter criteria includes multiple first filter criteria that each filter audio tracks according to a respective category of metadata that is common to media items streamable from the plurality of streaming media services; and
a second region that includes a graphical representation of (i) the retrieved search results, and (ii) media-source identifiers that separate the retrieved search results into sets corresponding to respective streaming media services of the plurality of streaming media services, wherein each media source identifier identifies a respective streaming media service of the plurality of streaming media services;
receiving, via the computing device, input data indicating selection of a given media-source identifier from among the displayed media-source identifiers within the second region of the graphical interface, wherein the given media-source identifier identifies a particular streaming media service from among the plurality of streaming media services;
determining, via the computing device, a second set of filter criteria for filtering the retrieved search results, the second set of filter criteria different from the first set of filter criteria, wherein the second set of filter criteria includes multiple second filter criteria that each filter audio tracks according to a respective category of metadata that is specific to audio tracks streamable from the particular streaming media service; and
in response to receiving the input data indicating selection of the given media-source identifier, causing, via the computing device, the graphical display to update the graphical interface to display:
in place of the graphical representation of the first set of filter criteria within the first region of the graphical interface, a graphical representation of the determined second set of filter criteria; and
in place of the graphical representation of the retrieved search results within the second region of the graphical interface, a graphical representation of a subset of the retrieved search results, the subset consisting of search results from the particular streaming media service.

2. The method of claim 1, wherein causing the graphical display to display the graphical interface comprising the second region that includes the graphical representation of the retrieved search results comprises causing the graphical display to display, in the second region, a plurality of media-item identifiers that each identify a respective media item.

3. The method of claim 2, wherein causing the graphical display to update the graphical interface to display the graphical representation of the subset of the retrieved search results comprises causing the graphical display to display a subset of the plurality of media-item identifiers, the subset of media-item identifiers each identifying a respective media item from the particular streaming media service.

4. The method of claim 1, wherein the plurality of streaming media services consist of a set of streaming media services that are registered with a particular media playback system that is associated with the computing device, the method further comprising:
    before causing the graphical display to display the graphical interface comprising the first region and the second region, determining, via the computing device, the first set of filter criteria based on at least the plurality of streaming media services, the first set of filter criteria specific to the set of streaming media services that are registered with the particular media playback system.

5. The method of claim 1, further comprising, before causing the graphical display to display the graphical interface comprising the first region and the second region:
    receiving, via the computing device, filter-criteria information from at least one of the plurality of streaming media services, the received filter-criteria information indicating respective filter criteria specific to the at least one streaming media service; and
    determining, via the computing device, the first set of filter criteria based on at least the received filter-criteria information.

6. The method of claim 1 further comprising:
    before causing the graphical display to display the graphical interface comprising the first region and the second region, generating, via the computing device, generic filter criteria based on filter-criteria information from a first streaming media service and filter-criteria information from a second streaming media service, the filter-criteria information from the first streaming media service indicating the multiple first filter criteria that each filter audio tracks according to a respective category of metadata that is specific to audio tracks streamable from the first streaming media service and the filter-criteria information from the second streaming media service indicating the multiple second filter criteria that each filter audio tracks according to a respective category of metadata that is specific to audio tracks streamable from the second streaming media service.

7. The method of claim 6, wherein the first set of filter criteria comprises the generic filter criteria.

8. A tangible non-transitory computer-readable medium having instructions stored thereon that are executable by at least one processor of a computing device to cause the computing device to perform a method comprising:
    receiving input data indicating a search string;
    retrieving, via a network interface of the computing device, respective search results from a plurality of streaming media services, wherein the respective search results indicate audio tracks corresponding to the search string;
    causing a graphical display to display a graphical interface comprising:
        a first region that includes a graphical representation of a first set of filter criteria for filtering the retrieved search results according to respective metadata associated with the audio tracks indicated within the search results, wherein the first set of filter criteria includes multiple first filter criteria that each filter audio tracks according to a respective category of metadata that is common to media items streamable from the plurality of streaming media services; and
        a second region that includes a graphical representation of (i) the retrieved search results, and (ii) media-source identifiers that separate the retrieved search results into sets corresponding to respective streaming media services of the plurality of streaming media services, wherein each media source identifier identifies a respective streaming media service of the plurality of streaming media services;
    receiving input data indicating selection of a given media-source identifier from among the displayed media-source identifiers within the second region of the graphical interface, wherein the given media-source identifier identifies a particular streaming media service from among the plurality of streaming media services;
    determining a second set of filter criteria for filtering the retrieved search results, the second set of filter criteria different from the first set of filter criteria, wherein the second set of filter criteria includes multiple second filter criteria that each filter audio tracks according to a respective category of metadata that is specific to audio tracks streamable from the particular streaming media service; and
    in response to receiving the input data indicating selection of the given media-source identifier, causing the graphical display to update the graphical interface to display:
        in place of the graphical representation of the first set of filter criteria within the first region of the graphical interface, a graphical representation of the determined second set of filter criteria; and
        in place of the graphical representation of the retrieved search results within the second region of the graphical interface, a graphical representation of a subset of the retrieved search results, the subset consisting of search results from the particular streaming media service.

9. The tangible non-transitory computer-readable medium of claim 8, wherein the search results comprise media-item information that comprises at least one of an artist name, an album title, or a genre for each media item corresponding to the search string.

10. The tangible non-transitory computer-readable medium of claim 9, wherein causing the graphical display to display the graphical interface comprising the second region that includes the graphical representation of the retrieved search results comprises causing the graphical display to display, in the second region, a plurality of media-item identifiers that each identify a respective media item.

11. The tangible non-transitory computer-readable medium of claim 8, wherein the plurality of streaming media services consist of a set of streaming media services that are registered with a particular media playback system that is associated with the computing device, the method further comprising:
    before causing the graphical display to display the graphical interface comprising the first region and the second region, determining, via the computing device, the first set of filter criteria based on at least the plurality of streaming media services, the first set of filter criteria specific to the set of streaming media services that are registered with the particular media playback system.

12. The tangible non-transitory computer-readable medium of claim 8, the instructions further comprising:
    before causing the graphical display to display the graphical interface comprising the first region and the second region, receiving filter-criteria information from at least one of the plurality of streaming media services, the received filter-criteria information indicating respective filter criteria specific to the at least one streaming media service; and determining the first set of filter criteria based on at least the received filter-criteria information.

13. The tangible non-transitory computer-readable medium of claim 8, the instructions further comprising:
before causing the graphical display to display the graphical interface comprising the first region and the second region, generating, via the computing device, generic filter criteria based on filter-criteria information from a first streaming media service and filter-criteria information from a second streaming media service, the filter-criteria information from the first streaming media service indicating filter criteria that filter audio tracks according to respective categories of metadata that are specific to audio tracks streamable from the first streaming media service and the filter-criteria information from the second streaming media service indicating filter criteria that filter audio tracks according to respective categories of metadata that are specific to audio tracks streamable from the second streaming media service.

14. The tangible non-transitory computer-readable medium of claim 13, wherein the first set of filter criteria comprises the generic filter criteria.

15. A computing device comprising:
a graphical display;
a network interface;
an input interface;
tangible non-transitory computer-readable media; and
program instructions stored on the tangible non-transitory computer-readable media and executable by at least one processor to cause the computing device to:
receive, via the input interface, input data indicating a search string;
retrieve, via the network interface, respective search results from a plurality of streaming media services, wherein the respective search results indicate audio tracks corresponding to the search string;
cause the graphical display to display a graphical interface comprising:
a first region that includes a graphical representation of a first set of filter criteria for filtering the retrieved search results according to respective metadata associated with the audio tracks indicated within the search results, wherein the first set of filter criteria includes multiple first filter criteria that each filter audio tracks according to a respective category of metadata that is common to media items streamable from the plurality of streaming media services; and
a second region that includes a graphical representation of (i) the retrieved search results, and (ii) media-source identifiers that separate the retrieved search results into sets corresponding to respective streaming media services of the plurality of streaming media services, wherein each media source identifier identifies a respective streaming media service of the plurality of streaming media services;
receive, via the input interface, input data indicating selection of a given media-source identifier from among the displayed media-source identifiers within the second region of the graphical interface, wherein the given media-source identifier identifies a particular streaming media service from among the plurality of streaming media services;
determine a second set of filter criteria for filtering the retrieved search results, the second set of filter criteria different from the first set of filter criteria, wherein the second set of filter criteria includes multiple second filter criteria that each filter audio tracks according to a respective category of metadata that is specific to audio tracks streamable from the particular streaming media service; and
in response to receiving the input data indicating selection of the given media-source identifier, cause the graphical display to update the graphical interface to display:
in place of the graphical representation of the first set of filter criteria within the first region of the graphical interface, a graphical representation of the determined second set of filter criteria; and
in place of the graphical representation of the retrieved search results within the second region of the graphical interface, a graphical representation of a subset of the retrieved search results, the subset consisting of search results from the particular streaming media service.

16. The computing device of claim 15, wherein causing the graphical display to display the graphical interface comprising the second region that includes the graphical representation of the retrieved search results comprises causing the graphical display to display, in the second region, a plurality of media-item identifiers that each identify a respective media item.

17. The computing device of claim 16, wherein causing the graphical display to update the graphical interface to display the graphical representation of the subset of the retrieved search results comprises causing the graphical display to display a subset of the plurality of media-item identifiers, the subset of media-item identifiers each identifying a respective media item from the particular streaming media service.

18. The computing device of claim 15, wherein the plurality of streaming media services consist of a set of streaming media services that are registered with a particular media playback system that is associated with the computing device, and wherein the program instructions are executable by the at least one processor to further cause the computing device to:
before causing the graphical display to display the graphical interface comprising the first region and the second region, determining, via the computing device, the first set of filter criteria based on at least the plurality of streaming media services, the first set of filter criteria specific to the set of streaming media services that are registered with the particular media playback system.

19. The computing device of claim 15, wherein the program instructions are executable by the at least one processor to further cause the computing device to:
before causing the graphical display to display the graphical interface comprising the first region and the second region, generating, via the computing device, generic filter criteria based on filter-criteria information from a first streaming media service and filter-criteria information from a second streaming media service, the filter-criteria information from the first streaming media service indicating the multiple first filter criteria that each filter audio tracks according to a respective category of metadata that is specific to audio tracks streamable from the first streaming media service and the filter-criteria information from the second streaming media service indicating the multiple second filter criteria that each filter audio tracks according to a respective category of metadata that is specific to audio tracks streamable from the second streaming media service.

20. The computing device of claim 19, wherein the first set of filter criteria comprises the generic filter criteria.

* * * * *